April 1, 1947.   C. A. VOGT   2,418,437
ELECTRON TUBE TAPPING DEVICE FOR DEFECT TESTING
Filed Nov. 18, 1942   2 Sheets-Sheet 1

INVENTOR
CHARLES A. VOGT
BY John J. Rogan
ATTORNEY

April 1, 1947.  C. A. VOGT  2,418,437
ELECTRON TUBE TAPPING DEVICE FOR DEFECT TESTING
Filed Nov. 18, 1942   2 Sheets-Sheet 2

INVENTOR
CHARLES A. VOGT
BY John J. Rogan
ATTORNEY

Patented Apr. 1, 1947

2,418,437

UNITED STATES PATENT OFFICE 2,418,437

ELECTRON TUBE TAPPING DEVICE FOR DEFECT TESTING

Charles A. Vogt, St. Marys, Pa., assignor to Sylvania Electric Products Inc., Emporium, Pa., a corporation of Massachusetts Application November 18, 1942, Serial No. 466,081

10 Claims. (Cl. 315—369)

This invention relates to testing arrangements and more particularly to such as are used in testing electron tubes and similar devices.

A principal object is to provide a novel apparatus to determine impact testing of electron tubes for unstandard conditions, such as internal short circuits, loose and open contacts, noise, microphonism and the like.

For the purpose of noise testing and checking tubes for internal loose connections or shorts, it has been customary heretofore to insert the tubes into a socket in which the proper external circuit arrangements are provided for indicating noise and other defects in the inner connections between the lead-in pins and the active tube elements.

These circuit arrangements include an amplifier in the output circuit of the tube under test which amplifier in turn feeds a loudspeaker. The loudspeaker indicates the noise that may be caused by the motion of parts within the tube with respect to each other when the testing operator is tapping the tube by hand, for example with a small mallet. When checking for loose connections, lamps or neon tubes in the external circuit arrangements, and corresponding to the inner tube connections under test, indicate the defective connections when the tube is being tapped.

Great difficulty is experienced in establishing uniformity of tapping. Some operators will discard more tubes than necessary, while other operators are not critical enough. This difficulty is particularly pronounced in noise testing where another human element is involved, viz., the judgment about the quality and the volume of the noise coming from the loudspeaker. The main source of variation in these tests, however, is the difference in the mechanical shock imparted to the tubes by different operators as to strength, direction and point of application to the tube envelope.

The arrangements, according to the invention, eliminate most of the personal elements inherent in the hand tapping method. As a result, there is applied to every tube the same amount of shock, the same number of shocks, and the shocks are applied in two exactly defined directions with respect to the tube elements. These two directions are chosen at right angles to each other and to the tube axis.

In place of the hand mallet used for hand tapping, the new arrangement employs small reciprocating plungers which form the ends of movable iron cores controlled by a pair of solenoids. Two solenoids are positioned with their axes parallel to the plane of the testing socket, but perpendicular to the tube axis and perpendicular to each other. An exactly reproducible amount of mechanical shock to the tube is thus available for the motion of the plungers which are moved back and forth inside the solenoid coils, coming out just far enough to tap the tube envelope.

The invention therefore insures uniform test conditions for noise testing and saves time, because the operator is able to handle about 50% more tubes per unit time. Furthermore, it provides, for the first time, means for establishing measurable and reproducible standard conditions for noise testing adaptable to large volume production, whereas the conventional method is substantially based on the personal equation.

Accordingly, it is an object of the invention to provide impact impulses of controllable strength for noise testing and for open or short circuits in electron tubes.

It is another object of the invention to provide, alternately, at least two impact impulses to a radio tube perpendicular to each other and to the axis of the tube.

It is a further object of the invention to provide an automatic timing system for imparting periodical impact impulses to a radio tube for the purpose of noise testing and the like.

A still further object of the invention is to increase the speed of testing radio tubes for noise, internal shorts and similar defects. Finally, it is an object of the invention to provide a combination of two solenoids at right angles to each other and to the axis of a radio tube whereby a reciprocating motion of two plungers is obtained.

In the drawing which shows one preferred embodiment,

Figure 1:
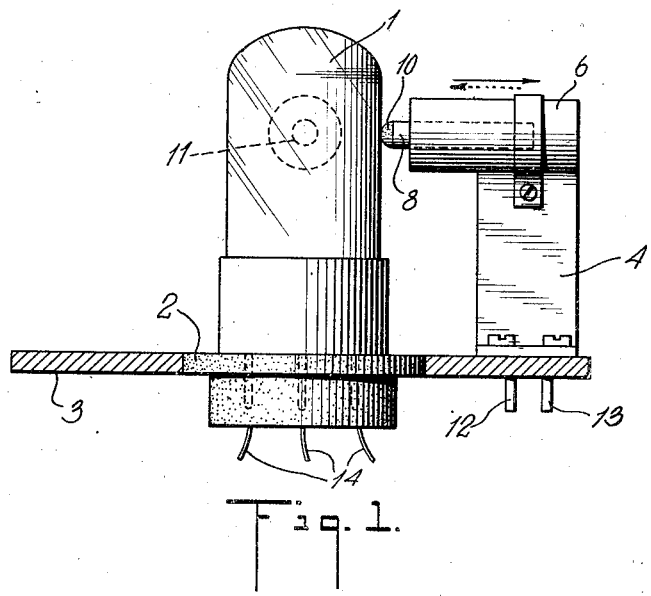
Fig. 1 is an elevational view of the mechanical arrangement of the tube tapper mechanism.
Figure 2:
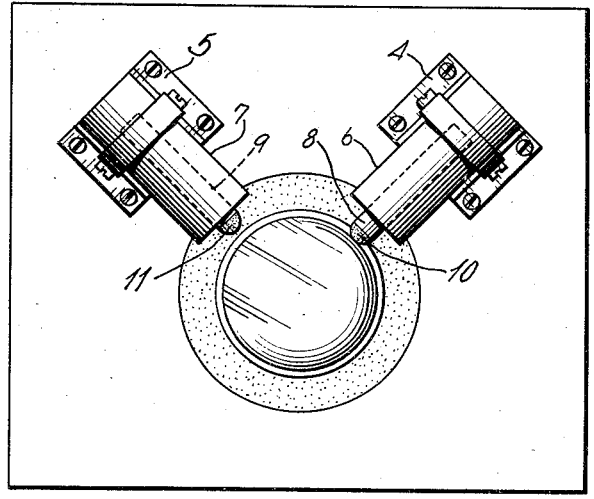
Fig. 2 is a top-plan view of Fig. 1.

Referring to Figs. 1 and 2, there is shown a conventional radio tube 1 which is to be tested and is adapted to be plugged into a receptacle or socket 2 suitably fastened in a table or other support 3. Also mounted on table 3 are two brackets 4, 5, to the upper ends of which are fastened the double acting solenoids 6, 7. Each solenoid is provided with a reciprocating electro-mechanical plunger 8, 9, the forward end of which carries a small tip 10, 11, of rubber, felt or other suitable soft material. Each solenoid has two winding sections, one of which when energized forces the plunger in the direction of the full-line arrow (Fig. 1) and the other when energized forces the plunger in the direction of the dotted arrow. The winding sections of each solenoid are arranged to be energized alternately at a predetermined rate with the result that the plungers 7, 8, deliver accurately short impacts or hammer blows to the tube 1. As will be seen from Fig. 2, the solenoids are mounted so that the lines of action of their respective plungers are substantially at right angles. If desired, the plungers may be biased to a normal position by means of a spring (not shown) so that when neither section is energized, the plunger is held away from the tube under test. If desired, each plunger may be provided with shoulders adjacent the ends, and cooperating with corresponding inward shoulders to the bore of the solenoid so as to limit the movement of the plunger in each direction. Preferably, the entire assembly including the brackets is adjustably fastened on table 3 so as to enable the device to be used to test tubes of different diameters and heights.

Each solenoid is provided with three lead-in connections, but if desired, the midpoint between the two sections of each solenoid winding can be connected to the bracket 4 which may be grounded. In that case the opposite ends of each coil section may be connected to corresponding lugs 12, 13. The lead wires 14 from the socket 2, are connected to any well-known indicating device such as an amplifier-loud speaker arrangement, whereby the mechanical impacts of the tappers 8, 9, on the tube 1, are translated into characteristic sounds or visual indications, should there exist any loose contacts, open contacts or other abnormal noise producing conditions within the tube. It will be understood that the invention is not limited to two tappers and that a greater or less number may be provided and mounted so as to strike the tube under test at different angles.

Figure 3:
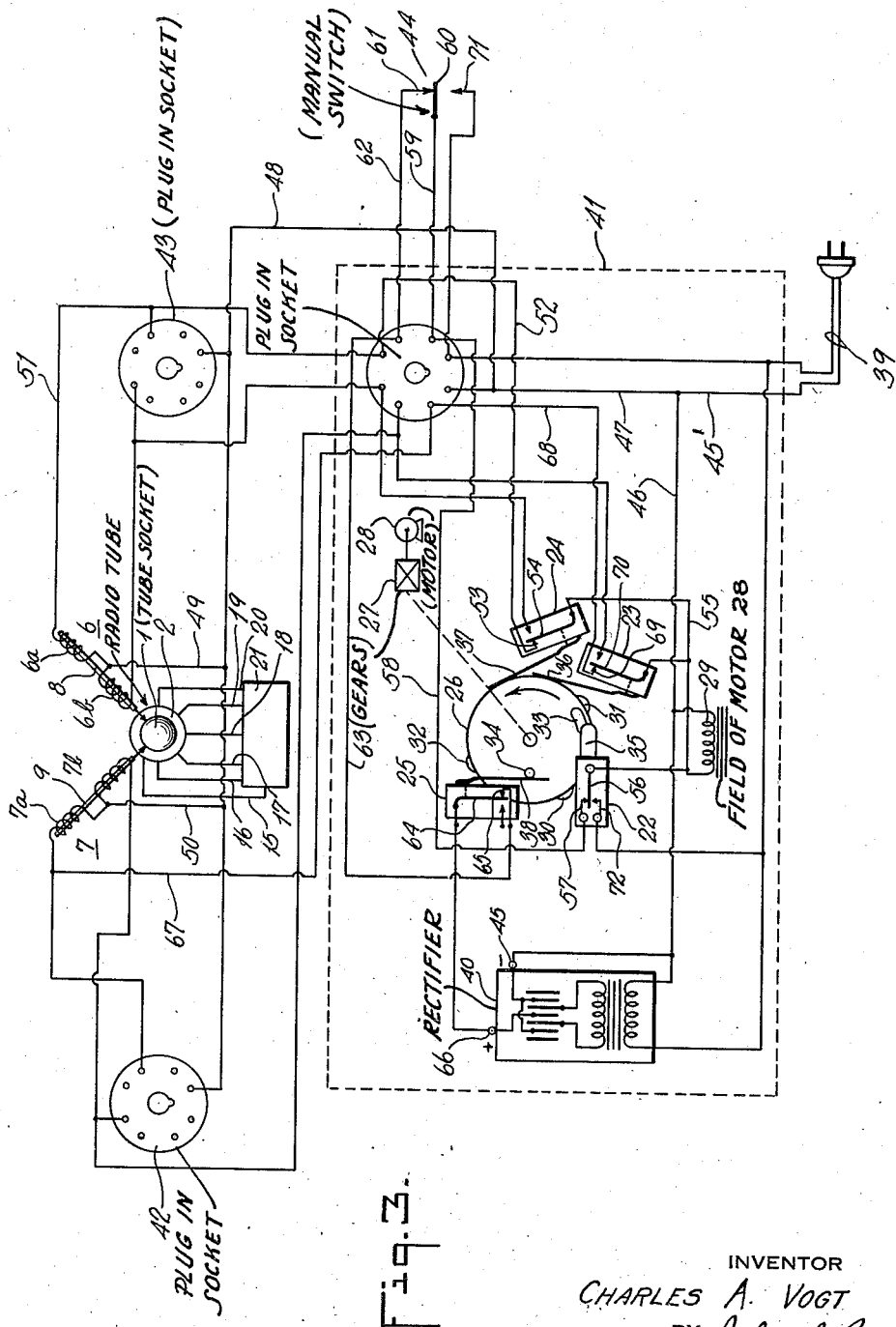
Fig. 3 is a composite wiring diagram of the automatic controls for the mechanism of Figs. 1 and 2.

Referring to Fig. 3, a description will now be given of the automatic control circuits for the tappers of Figs. 1 and 2. The tube 1 under test, is inserted into the socket 2, the terminals of which are connected by conductors 15—20 to the test indicating unit 21 which may be an amplifier-loud speaker or meter arrangement. Inasmuch as such units are well-known in the art (see U. S. Patents #1,487,298 and #1,540,355), further description is not needed herein, beyond stating that the unit supplies predetermined potentials to the various electrodes and parts of the tube under test so that the existence of loose connections, open circuits or other sources of noise within the tube are translated into visual and/or audible indications in unit 21. Each of the tapper units 6, 7, is provided with its respective solenoid winding sections 6a, 6b, and 7a, 7b, the energizations of which are automatically controlled by a set of switches 22—25, the cyclical operations of which are in turn controlled by a rotatable cam disc 26. Disc 26 is coupled through reduction gearing 27 to the shaft of induction motor 28 which is provided with a "braking" field winding 29. When motor 28 is running at normal speed, the disc 26 runs at approximately 60 R. P. M.

Disc 26 has around its periphery a series of switch operating cams 30, 31, 32, and on its flat face a cam 33 and a roller 34. Mounted around the periphery of disc 26 are the switches 22—25 the armatures or movable contacts of which are effectively controlled by the associated spring fingers 35—36. The fingers 36 and 37 are arranged to be operated in cyclical order under control of cams 30, 31 and 32; while finger 38 is controlled by roller 34; and finger 35 is controlled by cam 33. Power from the A. C. supply mains 39 feeds a rectifier 40 as well as feeding the winding 29 and the solenoid winding sections 6a, 6b, 7a, 7b. Merely for convenience of electrical attachment, the wires from the automatic control mechanism 41 are connected to suitable receptacles or sockets 42, 43, while the wires from the coils 6a, 6b, 7a, 7b, are connected by cables to corresponding plugs which can be inserted in the respective sockets 42, 43. For simplicity in the drawing, the separate plugs are omitted and the cables are shown directly connected to the respective socket terminals.

Rotation of disc 26 causes operation of switches 22—25 whereby windings 6a and 7b are simultaneously energized, and then windings 6b and 6a are simultaneously energized. Switches 22—25 control the starting and stopping of motor 28, depending upon the position of roller 34 and cam 33. Since plungers 8 and 9 are of magnetic material, they will undergo a reciprocating motion, so that the tips 10 and 11 strike the tube 1 alternately. The tube will therefore, during each cycle of rotation of disc 26, be tapped three times alternately by each of the plungers 8, 9. The cycle is started by closing the main switch 44.

In the position of the switches as shown in Fig. 3, a direct current flows from the minus terminal 45 of the rectifier 40, over conductors 46, 47, 48, 49, 50, to the midpoints between the respective windings 6a, 6b, and 7a, 7b; thence over two divided paths. One of these paths extends through winding 6a, over conductors 51, 52, contacts 53, 54, conductor 55, contacts 56, 57, conductors 58, 59, contacts 60, 61, conductors 62, 63, contacts 64, 65, to the positive direct current terminal 66. Consequently, a direct current flows through winding 6a. The second of the above-mentioned divided paths is completed through winding 7a, over conductors 67, 68, contacts 69, 70, conductor 55, and thence over the above described path to terminal 66. It will be observed that this direct current also flows through motor winding 29, braking the motor. Accordingly in this condition, plungers 8 and 9 are held in winding sections 6a, 7a, and therefore out of contact with tube 1.

When switch 44 is operated to close contacts 60 and 71 momentarily, all the above described D. C. circuits are opened and the motor starts rotating the disc 26. The starting circuit for the motor is traceable from conductor 45' through the motor field winding 29, armature 56, contact 22, and thence to the other line conductor. This circuit remains closed as long as finger 35 is not engaged by cam 33. When the disc begins rotating, it operates switch 22 to close contacts 56 and 72. At the same time instant roller 34 clears spring 38 thus opening contacts 64, 65. These latter contacts remain open until the disc has completed a full revolution.

When disc 26 has started rotating, but before cam 31 reaches spring 36, alternating current flows over conductors 45', 47, 48, thence through windings 6a, 7a. As soon as cam 31 engages spring 36 to operate switch 23, the A. C. circuit is transferred from winding 7a to winding 7b, and accordingly tapper 9 moves forward to strike tube 1. When cam 31 operates switch 24, switches 23 and 24 reverse and the A. C. energizes windings 6b and 7a, thus causing tapper 8 to strike the tube and tapper 9 to be withdrawn. During further rotation of the disc, the two windings 6a and 7b, are energized and then the two windings 6b and 7a are energized. After one complete revolution of the disc, switch 25 is opened by roller 34 and switch 22 at the same time opens the A. C. circuit and closes the first described D. C. circuit through the motor braking winding 29. Thus the original condition is reached with a D. C. flowing through windings 6a, 7a, to withhold both of the tappers from tube 1. At the same time winding 29 being energized by D. C. causes disc 26 to be held in its stationary position as shown.

The tube under test can then be removed from the socket 2, and a new tube inserted for testing. The above described cycle of operation is thereupon repeated for each tube inserted. If desired, the switch 44 can be arranged so that the insertion of a tube in socket 2 automatically closes the switch contacts 60, 71.

Various changes and modifications may be made in the disclosed embodiment without departing from the spirit and scope of the invention.

What I claim is:

1. Apparatus for determining the existence of unstandard conditions in a radio tube or the like, comprising means to support the tube at one end in a suitable socket, and means to subject the tube to repeated impacts at regularly recurrent timed intervals with the impacts being directed at different angles with respect to the main axis of the tube.

2. Apparatus according to claim 1 in which the said means for subjecting the tube to the impacts includes a pair of tube tapping devices arranged substantially at right angles to each other.

3. An arrangement for impact testing a device such as an electron tube to reveal unstandard conditions such as microphonism, loose contacts and the like, comprising a reciprocating tapper, means to mount said tapper for reciprocating movement towards and away from the device under test, and means for repeatedly operating said tapper at regularly timed intervals to subject the tube to repeated impacts.

4. An arrangement for impact testing of a device such as an electron tube for unstandard conditions such as microphonism, loose contacts and the like, comprising a pair of reciprocating tappers, means to mount said tappers, for reciprocating movement towards and away from said device, and means for operating said tappers at regularly timed intervals to subject the device to repeated impacts from different directions.

5. An arrangement according to claim 4 in which the tappers are mounted for reciprocating movement at an angle to each other.

6. An arrangement according to claim 4 in which each of said tappers is provided with an electromagnetic operating member and with an automatic switch for alternately energizing said electromagnetic members.

7. An arrangement according to claim 4 in which each of said tappers has an associated operating solenoid and an automatic switch is provided for controlling alternately the energizing circuits of said solenoids at said regularly recurrent intervals.

8. In a device of the character described, means to receive and support an electron discharge tube at one of its ends, means to support a plurality of reciprocating tube tappers, means to reciprocate said tappers so that they strike said tube at different angles with respect to its main axis, the last-mentioned means including an electromechanical operating means for each of said tappers, an energizing winding for each of said operating means, energizing circuits for said windings, contact sets for controlling each of said circuits, motor driven means for alternately and recurrently closing said contacts and thereby alternately and recurrently closing said energizing circuits, and a main manually operable switch for starting and stopping said motor driven means.

9. A device according to claim 8 in which said motor driven means comprises a rotating cam disc and said contact sets comprises at least four sets mounted with respect to said disc so as to be operated in timed sequence by the cams of said switch, two of said contact sets being connected respectively to each of said windings for alternately and recurrently controlling their energization, another of said contact sets being connected in circuit with the electric power circuit for said motor driven means to control the starting thereof, a braking arrangement for said motor driven means, and the fourth of said contact sets connected in circuit with said braking means for controlling the braking action thereof.

10. A device according to claim 8 in which each of said windings comprises a pair of sections one for pushing the associated tapper towards the tube and the other for pulling the tapper away from the tube.

CHARLES A. VOGT.

REFERENCES CITED

The following references are of record in the file of this patent:

UNITED STATES PATENTS

| Number | Name | Date |
|---|---|---|
| 1,825,548 | Rockwood et al. | Sept. 29, 1931 |
| 1,540,355 | Mathes | June 2, 1925 |
| 1,487,298 | Vennes | Mar. 18, 1924 |